US008118124B2

(12) United States Patent
Shin et al.

(10) Patent No.: US 8,118,124 B2
(45) Date of Patent: Feb. 21, 2012

(54) FAIL-SAFE AIR FLAP CONTROL APPARATUS FOR VEHICLE

(75) Inventors: Yong Suk Shin, Anyang-si (KR); Hun Soo Kim, Bucheon-si (KR); Hee Jun Jeong, Hwaseong-si (KR); In Cheol Kim, Yongin-si (KR)

(73) Assignees: Hyundai Motor Company, Seoul (KR); Kia Motors Corp.,, Seoul (KR); Hyundai Mobis Co., Ltd., Seoul (KR)

( * ) Notice: Subject to any disclaimer, the term of this patent is extended or adjusted under 35 U.S.C. 154(b) by 271 days.

(21) Appl. No.: 12/621,937

(22) Filed: Nov. 19, 2009

(65) Prior Publication Data

US 2011/0048691 A1 Mar. 3, 2011

(30) Foreign Application Priority Data

Aug. 27, 2009 (KR) ........................ 10-2009-0079684

(51) Int. Cl.
*B60K 11/08* (2006.01)

(52) U.S. Cl. ........................ 180/68.1; 454/75; 296/180.3
(58) Field of Classification Search .................... 454/69, 454/68.4, 68.6; 180/68.1, 68.4, 68.6
See application file for complete search history.

(56) References Cited

U.S. PATENT DOCUMENTS

| 5,205,484 A | * | 4/1993 | Susa et al. ..................... 236/35.3 |
| 5,876,088 A | * | 3/1999 | Spears ........................ 296/180.5 |
| 2006/0060401 A1 | * | 3/2006 | Bole ........................... 180/68.1 |
| 2006/0095178 A1 | * | 5/2006 | Guilfoyle et al. ............... 701/36 |

\* cited by examiner

*Primary Examiner* — J. Allen Shriver, II
*Assistant Examiner* — Erez Gurari
(74) *Attorney, Agent, or Firm* — Morgan, Lewis & Bockius LLP

(57) ABSTRACT

A fail-safe air flap control apparatus for a vehicle includes a coolant temperature sensor, a control unit, an actuator, a movable unit, a flap unit, an elastic member and a solenoid unit. The coolant temperature sensor measures the temperature of a coolant. The control unit compares a value measured by the sensor to a reference value and generates a corresponding control signal. The actuator has a rotator which rotates in a clockwise or counterclockwise direction depending on the control signal. The movable unit linearly moves under rotational force of the rotator. The flap unit includes a flap housing having an air flow slot, a flap door mounted to the flap housing to openably close the air flow slot, and a connecting rod connected to the movable unit. The elastic member applies elastic force to the movable unit in a direction in which the flap door opens. The solenoid unit is controlled by the control signal of the control unit so as to either restrain movement of the movable unit and so maintain the flap door in a closed state or to release the movable unit.

6 Claims, 5 Drawing Sheets

FAIL-SAFE AIR FLAP CONTROL APPARATUS FOR VEHICLE

CROSS-REFERENCE TO RELATED APPLICATION

The present application claims priority of Korean Patent Application Number 10-2009-0079684 filed on Aug. 27, 2009, the entire contents of which application is incorporated herein for all purposes by this reference.

BACKGROUND OF THE INVENTION

1. Field of the Invention

The present invention relates to a fail-safe air flap control apparatus for a vehicle which is constructed so as to prevent an air flap from stopping in a closed state when malfunctioning 2. Description of Related Art Generally, a water-cooled type engine cooling apparatus includes a water jacket, a water pump, a radiator, a fan and a thermostat. The water jacket surrounds the cylinders and combustion chamber of the engine. The water pump supplies water into the cylinders under pressure to circulate it around the cylinders. The radiator transfers heat of coolant, which has been heated, to the air. The fan assists the heat exchange of the radiator. The thermostat is used to rapidly increase the temperature of the coolant to a predetermined degree just after the engine starts.

In the water-cooled type engine cooling apparatus, a coolant flow channel is formed in a cylinder block and a cylinder head of the engine, and parts of the engine are cooled by passing water through the coolant flow channel. The coolant (water) which has cooled the cylinder block is forcibly sent to the radiator through a radiator hose by the water pump which is operated by a crankshaft pulley. The coolant which has entered the radiator dissipates heat through the radiator and is supplied to the engine again to cool the engine.

The radiator is a kind of tank which has a large heat dissipation area and is able to contain a large quantity of water. The radiator includes a pipe through which water passes, and fins which are in contact with the air and function to increase the heat dissipation area to dissipate into the air as much heat as possible. Furthermore, a radiator grill is provided on a predetermined portion of a front bumper of the vehicle to separate the radiator from the outside of the vehicle and improve the appearance of the vehicle.

The radiator grill functions to maintain a flow rate of air drawn into the vehicle therethrough constant and to physically protect the radiator from foreign substances contained in the air which is drawn into the vehicle.

Meanwhile, recently, a technique in which a flap control apparatus is installed between the radiator grill and the radiator to appropriately control the flow rate of air supplied into the radiator through the radiator grill depending on the temperature of the coolant of the engine was proposed. In this technique, before warming-up of the engine is completed, the flap control apparatus restrains air from being supplied to the radiator, thus reducing the time taken to complete the warming-up.

FIG. 1 is an exploded perspective view illustrating the structure supplying air to a radiator, according to a conventional technique.

As shown in FIG. 1, a radiator grill 11 is installed on a front bumper 10 of a vehicle. A cooling module 20, such as a radiator and an air conditioning condenser, is disposed behind the radiator grill 11.

The cooling module 20 is assembled with a carrier 21. An air flap control apparatus 30 is installed between the cooling module 20 and the radiator grill 11. The air flap control apparatus 30 functions to control the flow rate of air supplied to the cooling module 20 through the radiator grill 11.

When the temperature of a coolant of the engine is relatively low, because the engine must rapidly complete warming-up, the flap control apparatus 30 is closed to reduce the flow rate of air supplied to the cooling module 20 such that the temperature of the engine can be rapidly increased. After the warming-up of the engine is completed, the air flap control apparatus 30 is opened to increase the flow rate of air supplied to the cooling module 20 such that the cooling performance is increased.

Typically, an actuator or a solenoid is used as a drive unit to operate air flaps of the air flap control apparatus 30. However, when the actuator malfunctions because of, for example, breaking of a wire or a short circuit, the air flaps are stopped in the state they were in when the malfunction occurred. Hence, if the actuator malfunctions when the air flaps are in the closed state, air cannot be supplied to the cooling module despite completion of the warming-up of the engine, resulting in a severe engine cooling problem.

Furthermore, in the case where the solenoid is used as the drive unit to operate the air flaps, because the solenoid is operated in such a way as to close the air flaps using adhesive force generated when power is supplied thereto, if the solenoid malfunctions, the adhesive force is eliminated so that the air flaps go into an openable state.

However, when the solenoid malfunctions, the air flaps can be opened only by air drawn thereinto while the vehicle travels. Therefore, when the vehicle is not moving but the engine is being operated, the cooling performance is largely reduced. In addition, although the vehicle is moving, because the speed at which the vehicle runs is variable, the air flaps cannot maintain the completely opened state but continuously flap.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, the present invention has been made keeping in mind the above problems occurring in the prior art, and an object of the present invention is to provide a fail-safe air flap control apparatus for a vehicle which is constructed such that even if an electric device, such as an actuator, a solenoid unit, etc., malfunctions, an air flap can be maintained in the open state, thus preventing the engine from overheating.

In order to accomplish the above object, the present invention provides a fail-safe air flap control apparatus for a vehicle, including: a coolant temperature sensor, a control unit, an actuator, a movable unit, a flap unit, an elastic member and a solenoid unit. The coolant temperature sensor measures a temperature of a coolant of the vehicle. The control unit receives a value measured by the coolant temperature sensor, compares the measured value to a reference value, and generates a corresponding control signal. The actuator has a rotator rotating in a clockwise or counterclockwise direction depending on the control signal of the control unit. The movable unit linearly moves using rotational force of the rotator of the actuator. The flap unit is installed on an air flow channel through which air is drawn into a cooling module from a front side of the vehicle. The flap unit includes a flap housing having an air flow slot through which air passes, a flap door mounted to the flap housing so as to be rotatable to openably close the air flow slot, and a connecting rod extending from the flap door, the connecting rod being connected to the movable unit. The elastic member is provided between the movable unit and the flap housing to apply elastic force to the movable unit in a direction in which the flap door is opened. The solenoid unit is provided on the flap housing and is operated depending on the control signal of the control unit to restrain movement of the movable unit for maintaining the flap door in a closed state or to release the movable unit.

The movable unit may include a rotary arm having on a first end thereof a coupling rod inserted into the rotator and on a second end thereof a hinge, and a slider coupled at a first end thereof to the hinge such that the slider is linearly moved by the rotational force of the rotary arm, the slider being coupled at a second end thereof to the connecting rod.

The coupling rod may include a rotating shaft, and a stop protrusion protruding from a circumferential outer surface of the rotating shaft in a radial direction, the stop protrusion extending a predetermined length in a circumferential direction. Furthermore, a movable depression may be formed in the circumferential inner surface of the rotator. The movable depression may extend in the circumferential direction for a length greater than the circumferential length of the stop protrusion to allow the coupling rod inserted into the rotator to rotate with respect to the rotator in the circumferential direction, with power transmitting protrusions provided on both ends of the movable depression to apply the rotational force of the rotator to the stop protrusion of the coupling rod.

In addition, when the value measured by the coolant temperature sensor is less than the reference value, the control unit may control the actuator and the solenoid unit such that the rotator of the actuator rotates the movable unit in a direction in which the flap door is closed, power is supplied to the solenoid unit to restrain movement of the movable unit, and then the rotator of the actuator reversely rotates such that when the solenoid unit releases the movable unit, the coupling rod is able to rotate in the direction in which the flap door is opened.

Furthermore, when the value measured by the coolant temperature sensor is greater than the reference value, the control unit may control the actuator and the solenoid unit such that the power supply to the solenoid unit is interrupted to release the movable unit so that the movable unit is moved by the elastic member in the direction in which the flap door is opened, and then the rotator of the actuator rotates and holds the coupling rod such that the flap door remains in the opened state.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
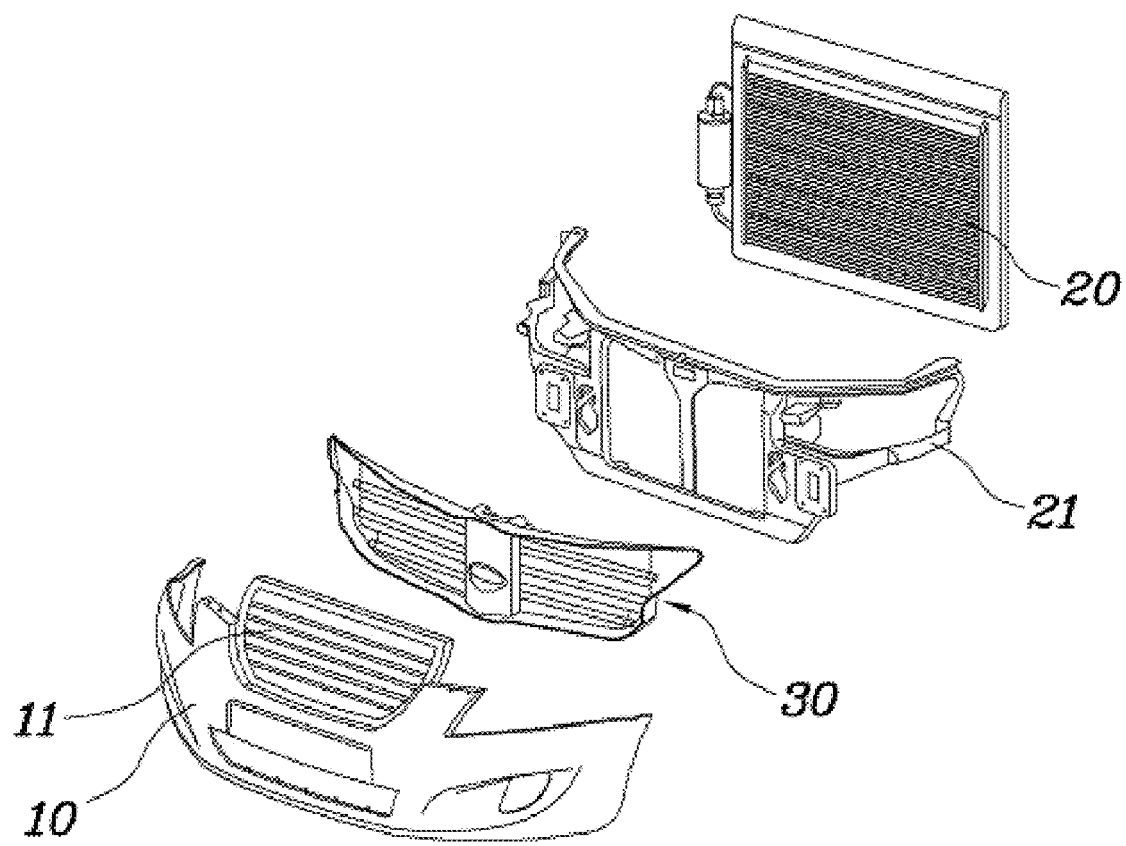
FIG. 1 is an exploded perspective view illustrating an air inflow structure of a typical radiator.
Figure 2:
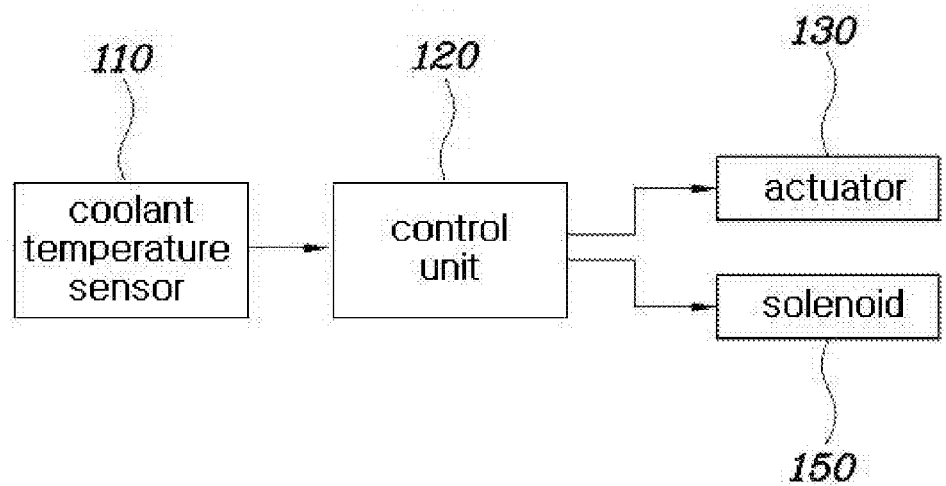
FIG. 2 is a block diagram illustrating the control of an exemplary fail-safe air flap control apparatus according to the present invention.
Figure 3:
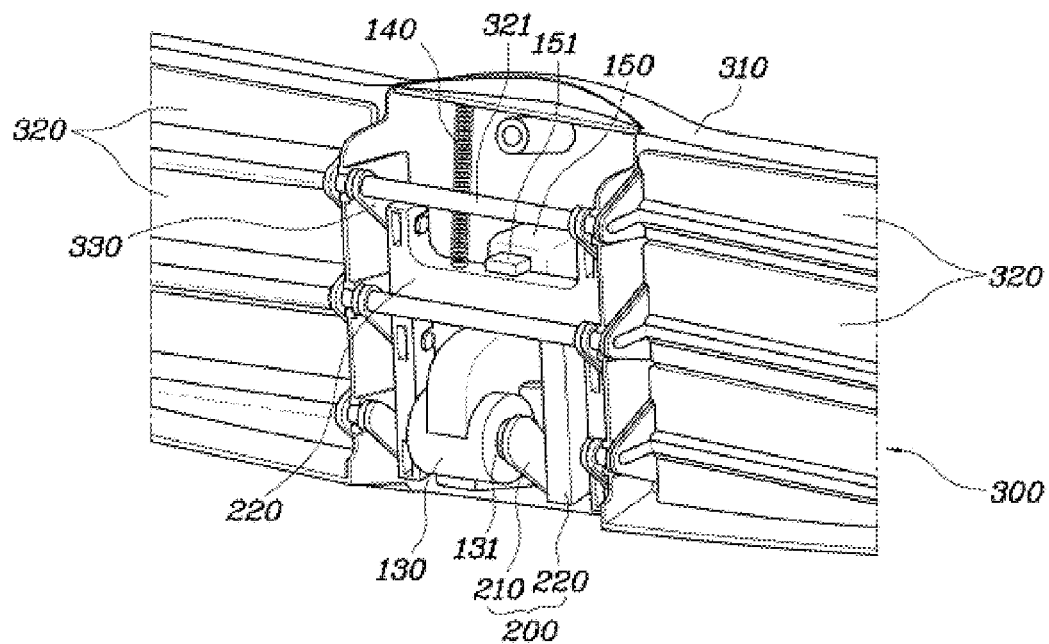
FIG. 3 is a view showing the construction of the fail-safe air flap control apparatus according to the present invention.

FIG. 2 is a block diagram illustrating the control of a fail-safe air flap control apparatus according to the present invention. FIG. 3 is a view showing the construction of the fail-safe air flap control apparatus according to the present invention.

As shown in FIGS. 2 and 3, the fail-safe air flap control apparatus for vehicles according to the present invention includes a coolant temperature sensor 110, a control unit 120, an actuator 130, a movable unit 200, a flap unit 300, an elastic member 140 and a solenoid unit 150.

The coolant temperature sensor 110 is provided on an engine at a predetermined position (typically, around a coolant circulation system which circulates coolant around the engine) to measure the temperature of the coolant of the vehicle. The coolant temperature of the engine acts as an important factor to obtain information about the engine. Thus, a typical electronic control engine includes a coolant temperature sensor. Therefore, the coolant temperature sensor that was previously installed in the engine can be used as the coolant temperature sensor 110 of the present invention, rather than using a separate coolant temperature sensor being installed in the engine.

Furthermore, the control unit 120 is electrically connected to the coolant temperature sensor 110. The control unit 120 compares a value measured and received from the coolant temperature sensor 110 to a reference value that was stored in the control unit 120 and, thereafter, it creates a corresponding control signal. In detail, depending on the control signal, a rotator 131 which is provided on one end of the actuator 130 rotates in a clockwise or counterclockwise direction.

Furthermore, flap doors 320 are opened or closed depending on the direction in which the rotator 131 rotates. Although various embodiments of the present invention are set such that when the rotator 131 rotates in a clockwise direction, the flap doors 320 are closed and when the rotator 131 rotates in a counterclockwise direction, the flap doors 320 are opened, the structure of the present invention is not limited to this.

The actuator 130 includes a reversible motor which can reversibly rotate to turn the rotator 131 in both directions. The general construction of the actuator 130 is a well known technique, therefore further explanation will be omitted.

Meanwhile, the movable unit 200 conducts linear motion using the rotational force transmitted from the rotator 131 of the actuator 130. The movable unit 200 includes a rotary arm 210 and a slider 220.

Figure 4:
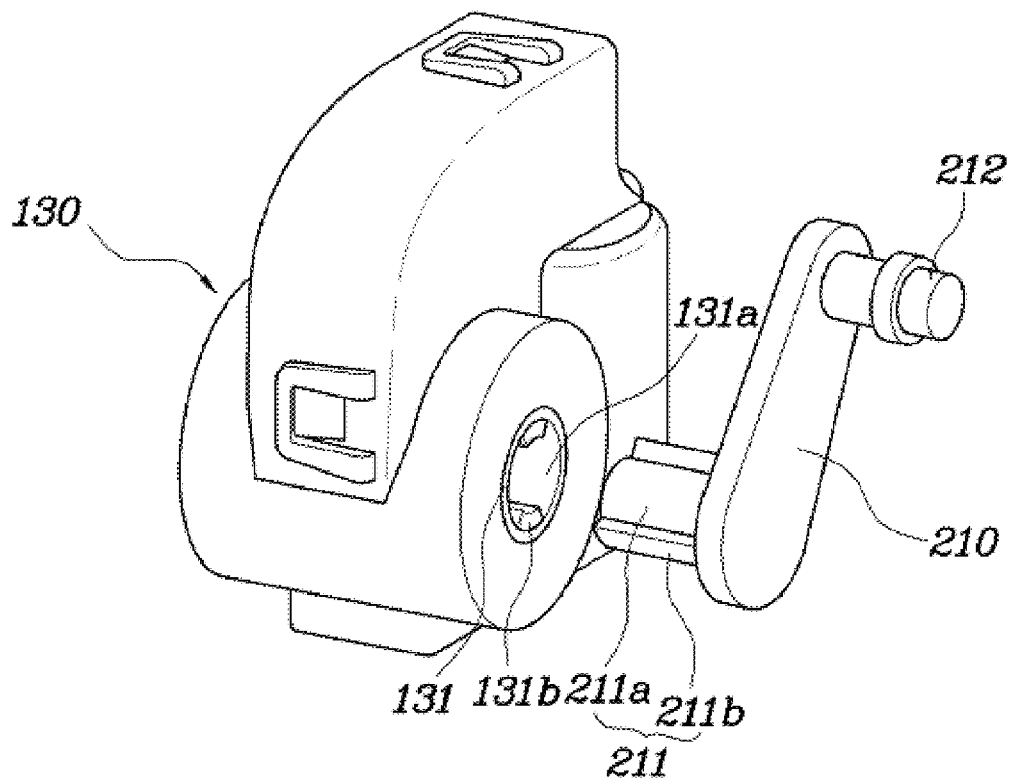
FIG. 4 is a perspective view showing the structure of coupling a rotating arm to an actuator according to the present invention.

FIG. 4 is a perspective view showing the structure of coupling the rotating arm 210 to the actuator 130 according to the present invention. As shown in FIG. 4, a coupling rod 211 is provided on a first end of the rotary arm 210, and a hinge 212 is provided on a second end of the rotary arm 210. The coupling rod 211 is inserted into the rotator 131. The rotary arm 210 is rotatably coupled to the slider 220 by the hinge 212.

When the coupling rod 211 which is inserted into the rotator 131 rotates, the hinge 212 rotates around the coupling rod 211 with a radius corresponding to the length of the rotary arm 210. Thereby, the slider 220 which is coupled to the hinge 212 is linearly moved.

As shown in FIG. 3, the slider 220 is coupled at a first end thereof to the hinge 212 and thus linearly moved in the vertical direction by the rotational force of the rotary arm 210. A second end of the slider 220 is coupled to connecting rods 330 which will be explained later and thus transmits the operating force to the flap doors 320.

Figure 5:
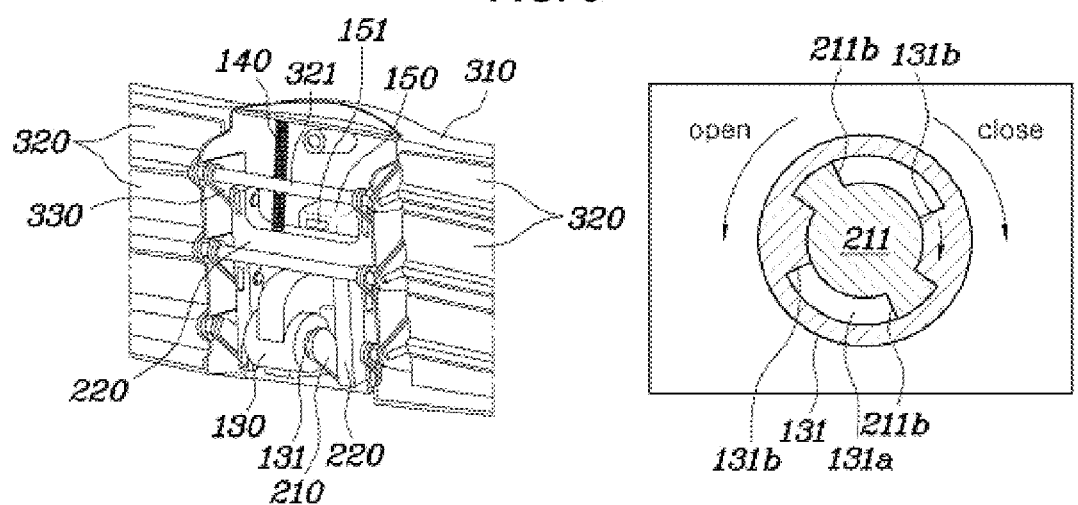
FIGS. 5 through 8 are views illustrating the operation of an exemplary fail-safe air flap control apparatus according to the present invention.

As shown in FIGS. 4 and 5, the coupling rod 211 has a rotating shaft 211a and stop protrusions 211b. The stop protrusions 211b protrude from the circumferential outer surface of the rotating shaft 211a in the radial direction. Each stop protrusion 211b extends a predetermined length in the circumferential direction. The rotating shaft 211a and the stop protrusions 211b may be inserted into the rotator 131 and be rotatable with respect to the rotator 131 within a predetermined angular range.

To achieve the above-mentioned purpose, movable depressions 131a are formed in the circumferential inner surface of the rotator 131. Each movable depression 131a has a circumferential length greater than that of the corresponding stop protrusion 211b to allow the coupling rod 211 inserted into the rotator 131 to rotate within a predetermined angular range with respect to the rotator 131 in the circumferential direction.

In other words, because the circumferential lengths of the stop protrusions 211b which are inserted into the corresponding movable depressions 131a are less than those of the movable depressions 131a, the coupling rod 211 is rotatable in the rotator 131 in the direction in which the rotator 131 rotates.

Furthermore, power transmitting protrusions 131b are provided on both ends of the movable depressions 131a to transmit rotational force to the stop protrusions 211b. The operation of opening or closing the flap doors 320 using the reciprocal movement between the power transmitting protrusions 131b, the movable depressions 131a and the stop protrusions 211b will be explained in detail later with reference to FIGS. 5 through 8.

The flap unit 300 is installed on an air flow channel through which air is drawn into a cooling module from the front side of the vehicle. The flap unit 300 includes a flap housing 310, the flap doors 320 and the connecting rods 330.

Air flow slots 311 through which air passes are formed through the flap housing 310. Thus, air which has passed through a radiator grill flows into the cooling module through the air flow slots 311.

Furthermore, the flap doors 320 are rotatably installed in the flap housing 310 to openably close the respective air flow slots 311. When the flap doors 320 close all the air flow slots 311, air cannot be drawn into the cooling module. Hereby, the heat dissipation rate of the cooling module is reduced, thus increasing the temperature of the coolant. When the flap doors 320 open the air flow slots 311, air is drawn into the cooling module, so that the heat dissipation rate of the cooling module is increased, thus reducing the temperature of the coolant.

In addition, the connecting rods 330 extend the flap doors 320 and are connected to the movable unit 200 such that the flap door 320 can be opened or closed by the operating force of the movable unit 200. The connecting rods 330 are rotatably coupled to the slider 220 of the movable unit 200, so that linear motion of the movable unit 200 is transmitted to rotating shafts 321 of the flap doors 320, thus rotating the flap door 320.

Meanwhile, as shown in FIG. 3, the elastic member 140 is installed between the movable unit 200 and the flap housing 310 to provide elastic force in the direction in which the flap doors 320 open. Even if the actuator 130 malfunctions when the flap doors 320 are in the closed state, because the rotary arm 210 which are inserted into the rotator 131 is rotatable with respect to the rotator 131 within a predetermined angular range, the flap doors 320 can be opened by the elastic force of the elastic member 140 applied to the movable unit 200 regardless of whether the actuator 130 can be operated.

For example, referring to FIG. 3, when the movable unit 200 moves upwards, the flap door 320 is opened. Here, even if the actuator 130 malfunctions and thus is not able to move the movable unit 200 upwards, the movable unit 200 can be moved upwards by the elastic force of the elastic member 140.

As such, if the actuator 130 does not any force to the movable unit 200, the movable unit 200 is always biased by the elastic member 140 in the direction in which the flap doors 320 are opened. Meanwhile, the solenoid unit 150 is installed on the flap housing 310 to restrict the movement of the movable unit 200 such that the flap doors 320 can stay in the closed state. The solenoid unit 150 is also operated by a control signal of the control unit 120.

When the control unit 120 generates a control signal, the solenoid unit 150 protrudes a stopper 151 using its magnetizing force. Thus, while the flap doors 320 are in the closed state, the stopper 151 restrains the movement of the movable unit 200 such that the movable unit 200 cannot move despite the elastic force of the elastic member 140.

In the fail-safe air flap control apparatus of the present invention having the above-mentioned construction, if a value measured by the coolant temperature sensor 110 is less than the reference value, the control unit 120 determines that the vehicle is in a state before warming up and thus rotates the rotator 131 of the actuator 130 in the direction in which the movable unit 200 moves to close the flap doors 320 (refer to FIG. 5).

Thereafter, power is supplied to the solenoid unit 150 to force the stopper 151 to protrude. When the stopper 151 protrudes, the movement of the movable unit 200 is restrained, so that the flap doors 320 stay in the closed state. Subsequently, the control unit 120 reversely rotates the rotator 131 of the actuator 130 such that when the solenoid unit 150 releases the movable unit 200, the coupling rod 211 can rotate in the direction in which the flap doors 320 open (refer to FIG. 6).

Meanwhile, when a value measured by the coolant temperature sensor 110 is greater than the reference value, the control unit 120 determines that the warming up has been completed and then shuts off the power supply to the solenoid unit 150 to retract the stopper 151 and release the movable unit 200 such that the flap doors 320 can be opened. Thus, the movable unit 200 is moved by the elastic restoring force of the elastic member 140 in the direction in which the flap doors 320 open (refer to FIG. 7).

Thereafter, to keep the flap doors 320 in the open state, the control unit 120 rotates the rotator 131 of the actuator 130 such that the rotator 131 holds the coupling rod 211 to prevent it from rotating. In detail, the power transmitting protrusions 131b of the rotator 131 hold the stop protrusions 211b of the coupling rod 211. Thereby, the flap doors 320 can be kept in the open state (refer to FIG. 8).

FIGS. 5 through 8 are views illustrating the operation of the fail-safe air flap control apparatus of the present invention. The operation of the air flap control apparatus of the present invention will be explained with reference to FIGS. 5 through 8.

Because the operation of the fail-safe air flap control apparatus according to the present invention under normal conditions has been described above, the following explanation will focus on the operation thereof when malfunctioning.

Figure 6:
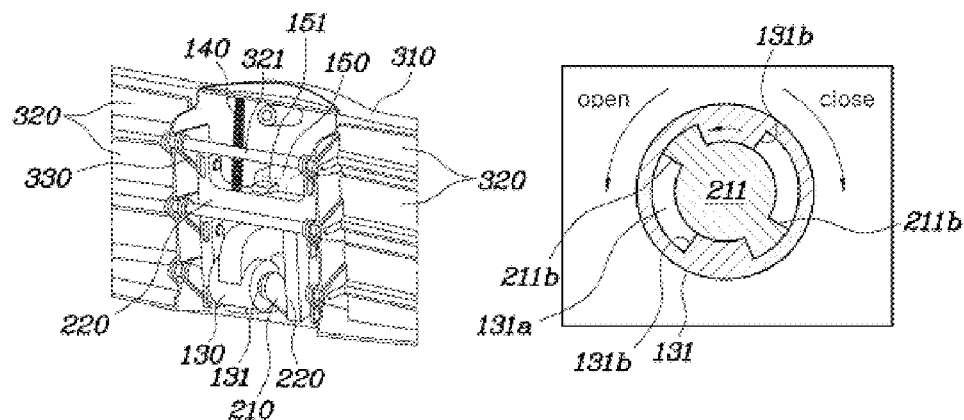
Figure 7:
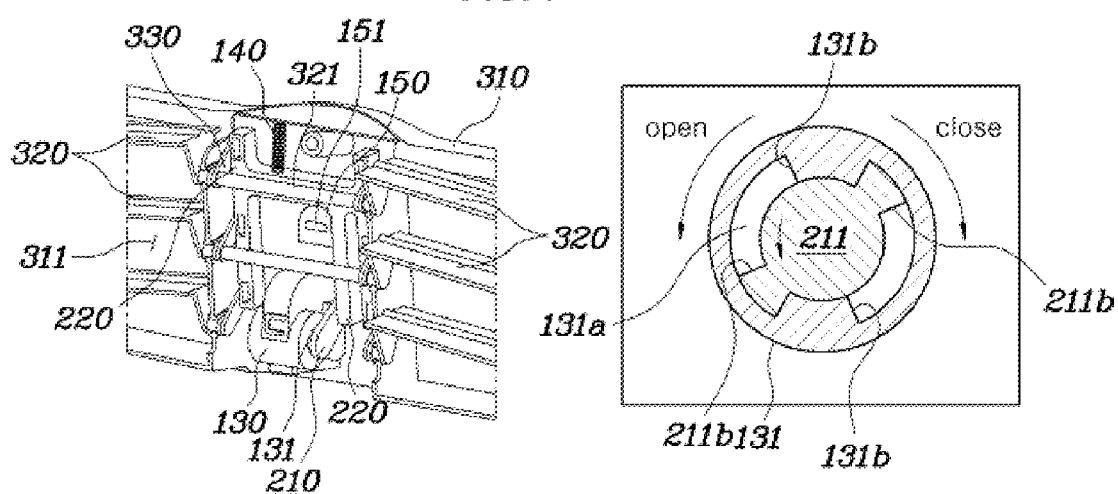

As shown in FIG. 6, if the actuator 130 and the solenoid unit 150 malfunction when the flap doors 320 are in the closed state, the power supply to the solenoid unit 150 is interrupted so that the stopper 151 which has protruded is retracted. Then, the movable unit 200 is moved upwards by the elastic restoring force of the elastic member 140, thus opening the flap doors 320.

Figure 8:
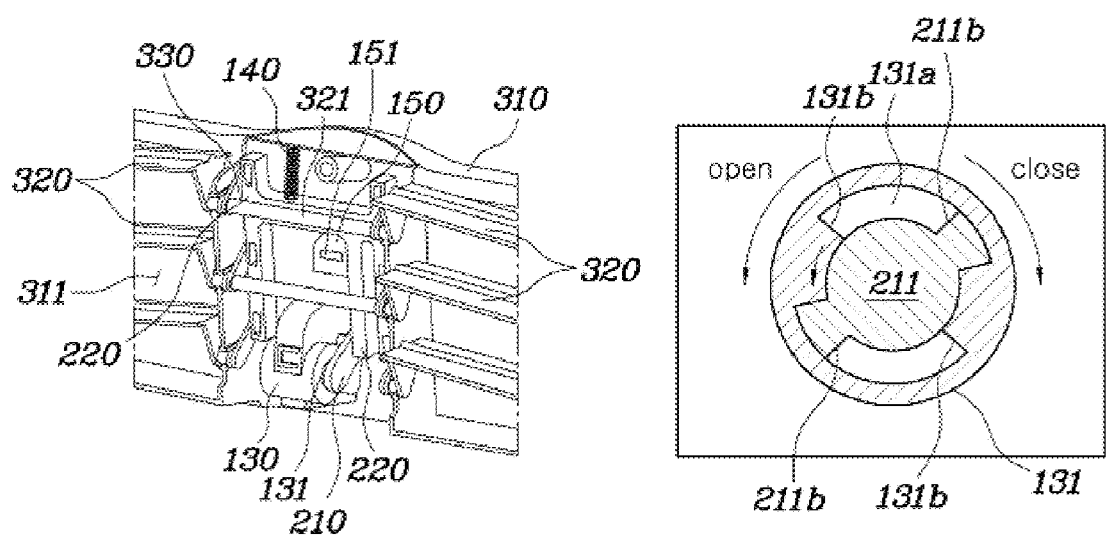

Furthermore, as shown in FIG. 8, even if the actuator 130 and the solenoid unit 150 malfunction when the flap doors 320 are in the open state, the flap doors 320 can remain in the open state due to the elastic restoring force of the elastic member 140. In addition, in this state, if the actuator 130 malfunctions, because the actuator 130 maintains the stationary state and the power transmitting protrusions 131b of the rotator 131 thus maintain the state of pushing the stop protrusions 211b of the coupling rod 211, the problem of the flap doors 320 flapping as a result of vibrations caused when the vehicle is moving can be solved.

As described above, in the present invention, even if an actuator and a solenoid unit malfunction when flap doors are in the closed state, the flap doors are automatically opened, so that the function of cooling an engine can be preserved, thus preventing the engine from overheating. If the actuator and the solenoid unit malfunction when the flap doors are in the open state, the flap doors can remain in the open state because the actuator maintains the stationary state. Therefore, the flap doors can be prevented from flapping due to the vibrations of the vehicle.

For convenience in explanation and accurate definition in the appended claims, the terms "front", "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fail-safe air flap control apparatus for a vehicle, comprising:
    a coolant temperature sensor measuring a temperature of a coolant of the vehicle;
    a control unit receiving a value measured by the coolant temperature sensor, comparing the measured value to a reference value, and generating a corresponding control signal;
    an actuator having a rotator rotating in a clockwise or counterclockwise direction depending on the control signal of the control unit;
    a movable unit configured for linear movement actuated by rotational force of the rotator of the actuator;
    a flap unit installed on an air flow channel through which air is drawn into a cooling module from a front side of the vehicle, the flap unit comprising:
        a flap housing having an air flow slot through which air passes;
        a flap door mounted to the flap housing so as to be rotatable to openably close the air flow slot; and
        a connecting rod extending from the flap door, the connecting rod being connected to the movable unit;
    an elastic member provided between the movable unit and the flap housing to apply elastic force to the movable unit in a direction in which the flap door is opened; and
    a solenoid unit provided on the flap housing, the solenoid unit being operated depending on the control signal of the control unit to restrain movement of the movable unit for maintaining the flap door in a closed state or to release the movable unit.

2. The fail-safe air flap control apparatus as set forth in claim 1, wherein the movable unit comprises:
    a rotary arm having on a first end thereof a coupling rod inserted into the rotator and on a second end thereof a hinge; and
    a slider coupled at a first end thereof to the hinge such that the slider is linearly moved by the rotational force of the rotary arm, the slider being coupled at a second end thereof to the connecting rod.

3. The fail-safe air flap control apparatus as set forth in claim 2, wherein the coupling rod comprises a rotating shaft, and a stop protrusion protruding from a circumferential outer surface of the rotating shaft in a radial direction, the stop protrusion extending a predetermined length in a circumferential direction, and
    a movable depression is formed in a circumferential inner surface of the rotator, the movable depression extending in the circumferential direction for a length greater than the circumferential length of the stop protrusion to allow the coupling rod inserted into the rotator to rotate with respect to the rotator in the circumferential direction, with power transmitting protrusions provided on both ends of the movable depression to apply the rotational force of the rotator to the stop protrusion of the coupling rod.

4. The fail-safe air flap control apparatus as set forth in claim 3, wherein when the value measured by the coolant temperature sensor is less than the reference value, the control unit controls the actuator and the solenoid unit such that the rotator of the actuator rotates the movable unit in a direction in which the flap door is closed, power is supplied to the solenoid unit to restrain movement of the movable unit, and then the rotator of the actuator reversely rotates such that when the solenoid unit releases the movable unit, the coupling rod is able to rotate in the direction in which the flap door is opened.

5. The fail-safe air flap control apparatus as set forth in claim 3, wherein when the value measured by the coolant temperature sensor is greater than the reference value, the control unit controls the actuator and the solenoid unit such that the power supply to the solenoid unit is interrupted to release the movable unit so that the movable unit is moved by the elastic member in the direction in which the flap door is opened, and then the rotator of the actuator rotates and holds the coupling rod such that the flap door remains in the opened state.

6. A vehicle comprising the fail-safe flap control apparatus as set forth in claim 1, the vehicle further comprising:
    a radiator grill disposed adjacent a front bumper;
    wherein the cooling module is disposed behind the radiator grill.

* * * * *